United States Patent [19]

Rasmussen

[11] Patent Number: 4,490,788

[45] Date of Patent: Dec. 25, 1984

[54] WELL-LOGGING DATA PROCESSING SYSTEM HAVING SEGMENTED SERIAL PROCESSOR-TO-PERIPHERAL DATA LINKS

[75] Inventor: Marvin W. Rasmussen, Austin, Tex.

[73] Assignee: Schlumberger Technology Corporation, Houston, Tex.

[21] Appl. No.: 427,070

[22] Filed: Sep. 29, 1982

[51] Int. Cl.³ .............................................. G06F 3/00
[52] U.S. Cl. .................................................. 364/200
[58] Field of Search ........................ 364/200 MS File

[56] References Cited

U.S. PATENT DOCUMENTS

| | | | |
|---|---|---|---|
| 3,462,741 | 8/1969 | Bush et al. | 364/200 |
| 3,564,509 | 2/1971 | Perkins et al. | 364/200 |
| 3,588,831 | 6/1971 | Figueroa et al. | 364/200 |
| 3,702,462 | 11/1972 | England | 364/200 |
| 3,820,079 | 6/1974 | Bergh et al. | 364/200 |
| 4,038,642 | 7/1977 | Bouknecht et al. | 364/200 |
| 4,074,352 | 2/1978 | Cook et al. | 364/200 |
| 4,093,981 | 6/1978 | McAllister et al. | 364/200 |
| 4,103,328 | 7/1978 | Dalmasso | 364/200 |
| 4,128,876 | 12/1978 | Ames et al. | 364/200 |
| 4,200,930 | 4/1980 | Rawlings et al. | 364/200 |

Primary Examiner—Raulfe B. Zache

[57] ABSTRACT

A well-logging well-site data acquisition and data processing system is disclosed. A central processing unit including a main memory and a single data bus is provided for data transfers with a first plurality of peripheral units. A plurality of serial link units are also provided. Each serial link unit includes a plurality of serial data input/output channels where each serial channel sends on transmit lines and receives on receive lines serial data between a second plurality of peripheral units connected to a serial link unit. A processor interface unit is provided for controlling the transfer of data between the host central processor unit and the plurality of serial link units. A microprocessor unit is provided as a communications controller for initiating the transfer of data between the plurality of serial link units and the processor interface unit. The plurality of serial link units in cooperation with the microprocessor unit and the processor interface unit enable the simultaneous input/output transfer of data to the peripherals to occur thereby increasing the effective data transfer rate of the system.

66 Claims, 9 Drawing Figures

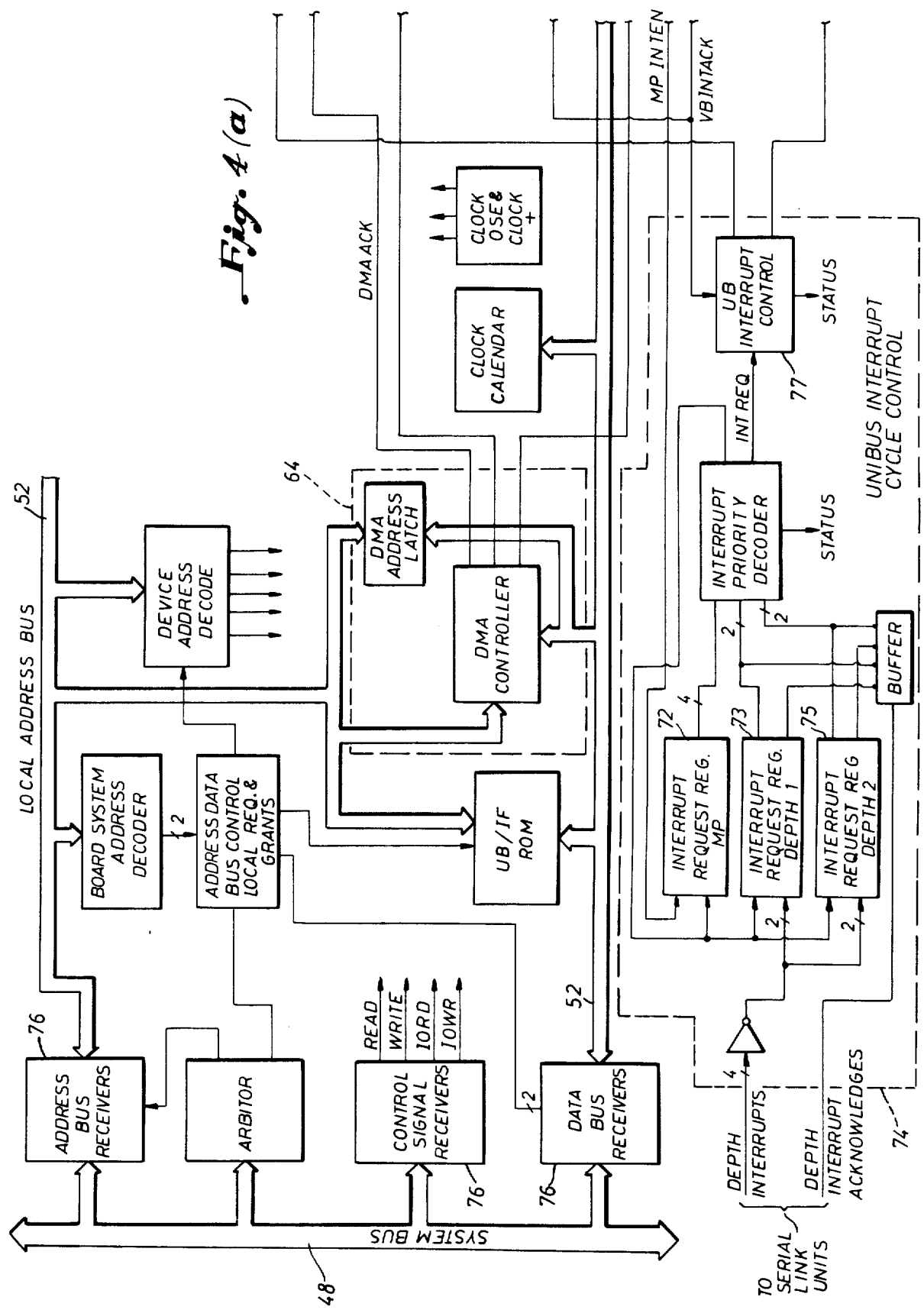

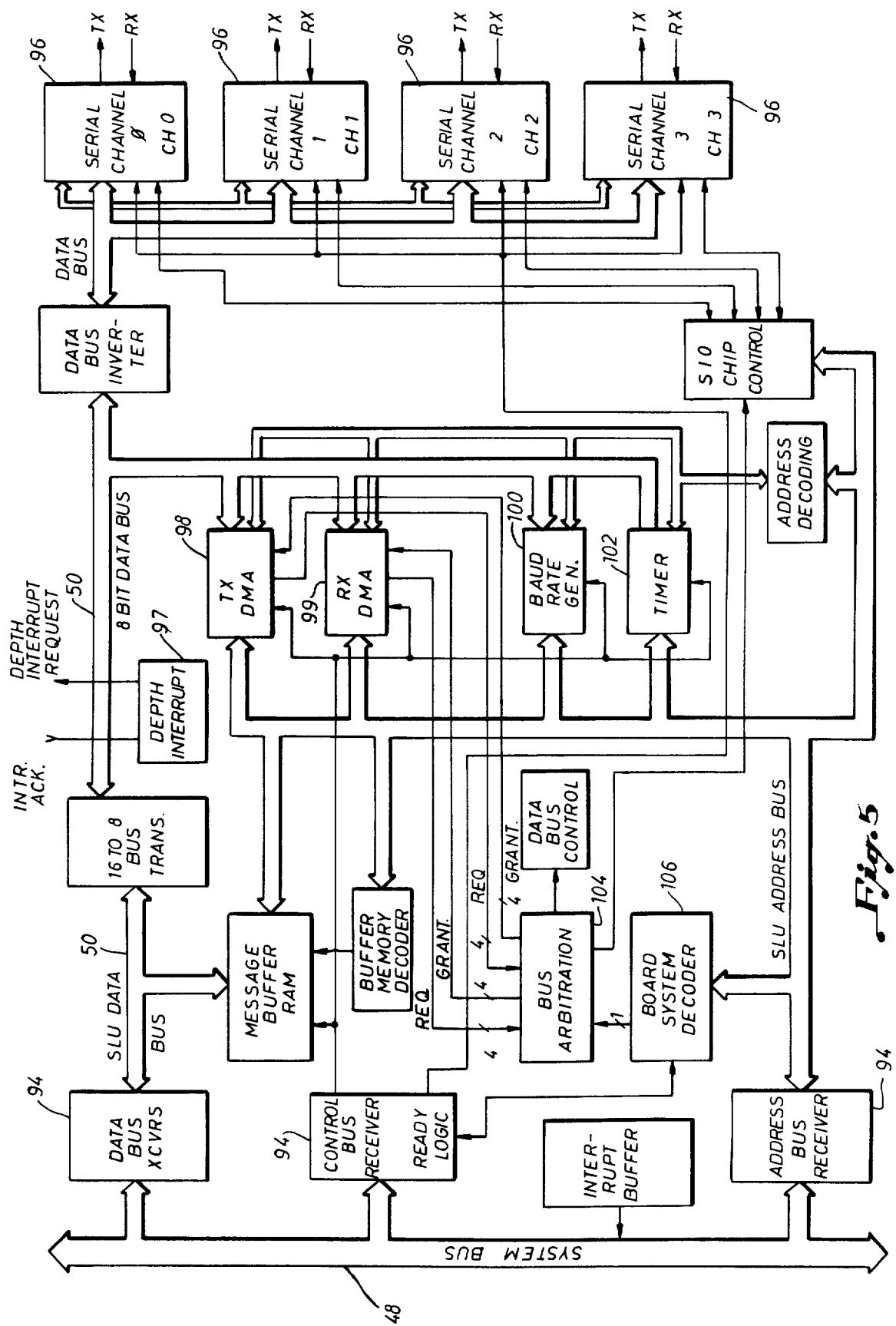

MESSAGE BLOCK STRUCTURE

CONTROL BLOCK STRUCTURE

STRUCTURE OF AN SDLC FRAME

WELL-LOGGING DATA PROCESSING SYSTEM HAVING SEGMENTED SERIAL PROCESSOR-TO-PERIPHERAL DATA LINKS

BACKGROUND OF THE INVENTION

This invention relates to data processing systems. More particularly, the invention relates to a well-logging data acquisition and data processing system for obtaining well-site measurements from logging tools traversing a well borehole, and for producing well-site logs in virtually real time.

A typical prior-art computer-controlled well-logging data acquisition and data processing system will include a large number of peripheral devices with which the host computer exchanges data. A large number of peripheral units are present in prior-art well-site data processing systems in order for the host computer to concurrently perform its multiple functions of gathering measurements of the signals coming from one or more logging tools traversing a well borehole, and the processing of these measurements to obtain and present logs of different well parameters in as near real time as possible. Included in these peripheral units is a tool interface for interfacing each type of logging tool which is traversing the well borehole to the environment of the data processing system. Peripheral units, such as magnetic tape units, disc memory units, keyboard hard copy printers, CRT graphic displays, strip chart recorders, etc., are typically required in order for well-logging data processing operations to be possible at the well-site.

These prior-art well-site data processing systems typically connect each of these peripherals to the host computer for communications therebetween over a single data bus. In a well-loging environment, this architecture has several disadvantages. The large number of separate peripheral units requires the interconnecting data bus to be excessively long. This excessive length reduces the speed at which signals can propagate along the bus, and tends to degrade the quality of the bus signals themselves. A failure in the bus results in the entire system being shut down, even where back-up redundant host computers are provided. These back-up computers must also communicate with the peripherals over the same bus as the host computer.

Another disadvantage present in prior-art well-site data processing systems having the single peripheral-to-processor communication link is the excessive software overhead required for the host computer to handle the input/output data transfers between processor and peripherals. For the host computer to perform involved data processing operations on the data coming from different logging tools running at the same time, and to handle the large number of input/output operations required to make these measurements and to present the process data for plotting, the system has had to make compromises in the speed at which the logging of the well may progress. Other compromises include limiting the number of tools which can be run at one time, limiting the kinds of tools that may be combined for a given traverse through the well borehole, and so on. These compromises have all resulted in an increase in the cost and the time required to perform a plurality of well-logging operations on a given well.

Other disadvantages are presented by this single data bus-to-peripheral communication link and its attendant software overhead problems. A severe limitation in ease of configuration of the system, a severe limitation in the number of peripherals that can be added to the system, and no redundancy in communications with peripherals are examples of other disadvantages.

It would be advantageous, therefore, to provide a well-site data processing system which provides a back-up communications link from a back-up host processor to certain of the peripherals so that a failure of the host computer, or of its data bus, will not disable the entire system. It would also be advantageous to provide a well-logging data processing system having a communications controller to handle virtually all communications between the host computer and a plurality of peripheral units in which a comparatively few processor data bus cycles are required to move message data to and from the host computer memory, following which the host is freed for other tasks. It would also be advantageous to provide a data processing system in which communications between a host computer and its peripheral units are handled over a plurality of shared/sharable data paths which can be segmented, and the segment independently used for concurrent data transfers among several groups of the peripherals, thereby to increase the effective data transfer rate of the system.

SUMMARY OF THE INVENTION

In accordance with the present invention, a well-logging data acquisition and processing system is disclosed. The system responds to signals from well-logging tools contained in a well borehole drilled into the earth's formations. The system generates output logs of well parameters determined from the measurements of the logging tool signals.

The system comprises first and second parallel central processors, each including a main memory unit for storing program routines and for storing data comprising messages to and from a first plurality of peripheral units. Each processor includes a plurality of serial link units, a processor interface unit, a microprocessor unit, and a processor bus.

Each serial link unit includes an internal bus and each includes a plurality of serial data input/output channels which are interconnected by the serial link bus. Each serial link channel transmits on transmit lines and receives on receive lines serial data to and from a first plurality of the peripheral units.

The processor interface unit responds to data ready signals to control the transfer of data between its associated central processor unit and a plurality of serial link units. The interface unit also includes an internal interface bus.

The microprocessor unit responds to the processor interface unit and the serial link units to initiate the transfer of data between the plurality of serial link units and the processor interface unit. The plurality of serial link units enable the simultaneous input/output transfer of data to occur to a plurality of the peripherals in the first plurality of peripherals.

The processor bus is provided for data transfers between the associated central processor unit, its main memory, the processor interface unit and a second plurality of peripheral units.

The data processing system further includes a switch means connected to said processor buses and the transmit and receive lines from each channel of each of the serial link units. The switch means responds to a switch command to control which of the first or second processor units is connected to said peripherals for data transfers therewith.

In a more narrow aspect of the invention, each of the central processing units further includes a system bus interconnecting the associated microprocessor unit, the processor interface unit and the plurality of serial link units for data transfers therebetween. The plurality of buses enable the transfer of data to occur simultaneously over established data links between (1) the processor unit and the interface unit, (2) the interface unit and the microprocessor unit, (3) the interface unit and one of the plurality of serial link units, (4) the microprocessor and one of the plurality of serial link units, and (5) each of the plurality of serial link units and any one of the peripherals in the first plurality of peripherals that is connected to the plurality of serial input/output channels of the serial link unit.

The processor interface unit includes a plurality of interface data registers that are connected to the processor bus for temporarily storing information being passed between the processor unit and the microprocessor unit or the plurality of serial link units. A direct memory access unit is also included. The direct memory access unit is responsive to the microprocessor unit for transferring data between the interface data registers and the serial link units. A means is also provided, responsive to the microprocessor unit, for transferring data between the interface data registers and the main memory of the central processor. This transferring means and the direct memory access unit of the processor interface unit responds to initiating signals from the microprocessor unit to enable data comprising outgoing message data to be transferred from the main memory of the processor unit to one of the serial link units, and vice versa. The transferring means obtains data from the main memory independently of processor control.

Each of the serial link units comprises a message buffer memory, receive and transmit direct memory access units, and a plurality of serial controllers. The message buffer memory is connected to the serial link bus for temporarily storing incoming and outgoing message data for a peripheral connected to the serial link unit.

The receive direct memory access unit is connected to the serial link bus for controlling the transfer of data between the receive lines of the plurality of serial input/output channels and the buffer memory. The transmit direct memory access unit is also connected to the serial link bus and controls the transfer of data between the transmit lines of the plurality of serial input/output channels and the buffer memory.

The plurality of serial controllers are also connected to the serial link bus, and each controller is associated with one of the plurality of serial input/output channels. Each controller supervises the exchange of data between the peripheral connected to the serial channel and the buffer memory in the serial link unit.

The processing system of the present invention further includes a baud rate generator and timer which is also connected to the serial link bus. The baud rate generator generates timing signals to the plurality of serial controllers and the direct memory access units in a serial link unit to determine the transmission rate of the serial data to the peripherals connected to the serial link unit.

Each transmit and receive direct memory access unit in a serial link unit each comprises a plurality of direct memory access channels. Each direct memory access channel is associated with one of the plurality of serial input/output channels of the serial link unit. Also included in the serial link unit is a bus arbitration unit for resolving access to a serial link unit bus between the serial link direct memory access units and any data transfers to said serial link unit from the microprocessor unit or from the processor interface unit.

The direct memory access units of each serial link unit gain access to the buffer memory on a priority basis. The priority alternates between the transmit and receive direct memory access units as to which access unit will obtain control of the serial link bus. The bus arbitration unit determines the priority. The plurality of direct memory access channels contained in each direct memory access unit also have a relative priority therebetween. This priority is rotating between the various channels where the channel last serviced will be last to be serviced again, i.e., the last channel services has the lowest priority.

In an alternate embodiment of the invention, all of the peripherals are connected to the host computer through a serial link channel rather than having some of the peripherals connected to a single data bus link and the rest of the peripherals connected to the host computer through serial link channels.

BRIEF DESCRIPTION OF THE DRAWINGS

For a fuller understanding of the present invention, reference should be had to the following detailed description taken in conjunction with the accompanying drawings in which:

FIG. 5 is a detailed functional block diagram of a serial link unit shown in FIG. 3;

Similar reference numerals refer to similar parts throughout the several views of the drawings.

DETAILED DESCRIPTION OF THE PREFERRED EMBODIMENT OF THE INVENTION

A Prior-Art Well-Site Data Processing System

Figure 1:
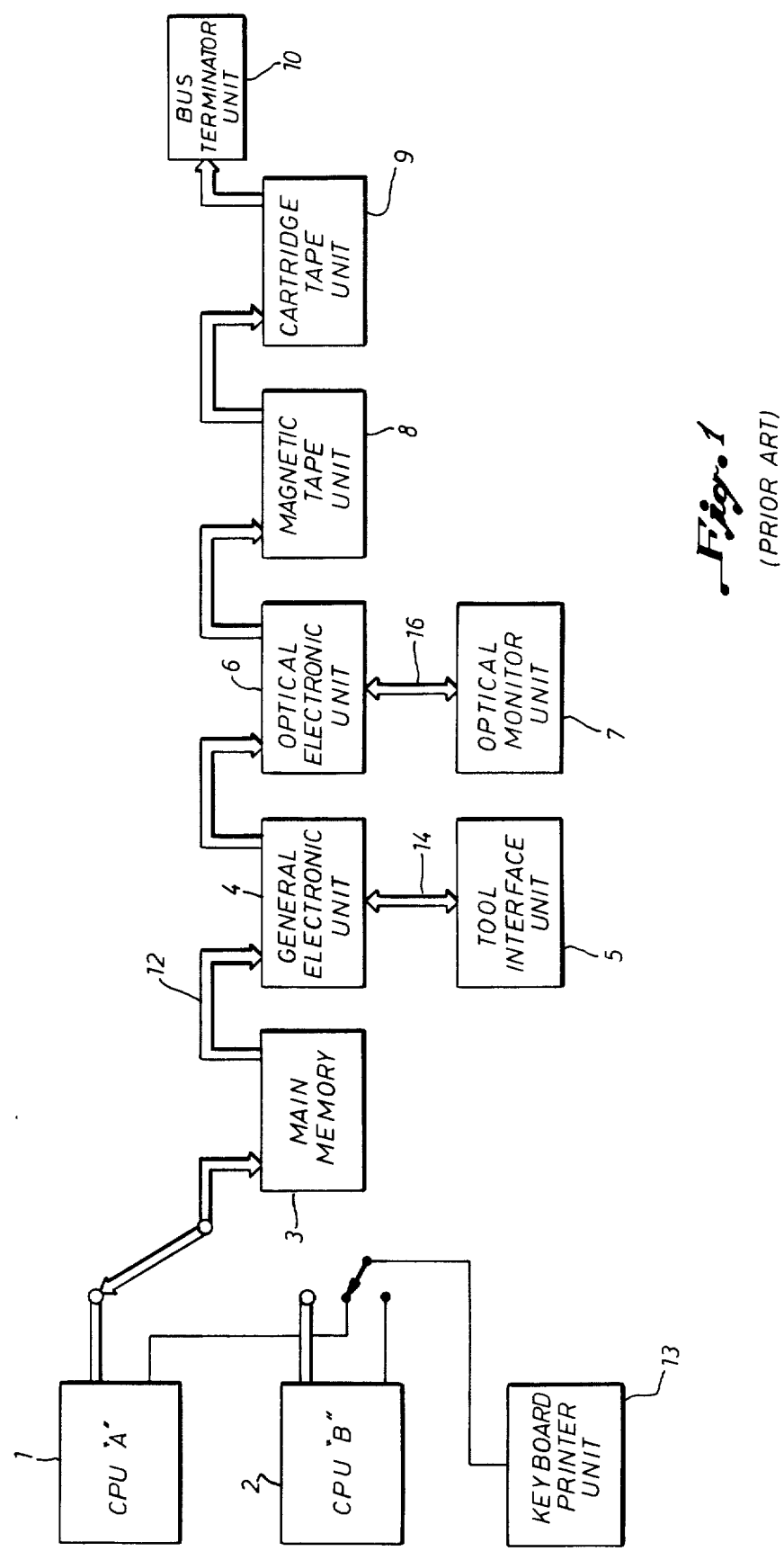
FIG. 1 is a block diagram of a typical prior-art well-logging data acquisition and processing system having a single data bus interconnecting the host computer with a plurality of peripheral units.

Turning now to the figures and first to FIG. 1, there is shown a functional block diagram of a typical prior-art well-site data processing system having a pair of parallel redundant processor units 1, 2 switch selectable to a single shared data bus link 12 connecting several peripheral units to a selected one of the processors. Located at the far end of data bus 12 is the bus terminator unit 10. As shown in FIG. 1, the data bus 12 must extend from a selected processor 1, 2 to the bus termination unit 10 after having been serially connected to each of the peripheral units in the system. This busing arrangement results in an excessive length for the data bus for the system with a large number of peripheral devices. This excessive length results in a degradation in the speed with which data transfers can occur over the bus 12 between the various peripheral units.

Included in the peripheral units shown in FIG. 1 is a general electronics unit 4 which communicates via data link 14 to a tool interface unit 5. The tool interface 5 constitutes the electrical interface between the various logging tools to the digital processing environment of the data processing system. Each tool which is traversing the well borehole will have a tool module containing the circuits required to perform this interface function.

To produce well-site logs which are typically produced from well-logging data, the optical electronic unit 6 is provided as one of the peripheral units. Connecting the optical electronics unit 6 with the the actual devices which generate the logs is a data link 16. Data link 16 connects the optical electronics unit 6 to the optical monitor unit 7. Also included in the data processing system shown in FIG. 1 is a magnetic tape unit 8 and a cartridge tape unit 9 for permanent storage of data and computer operating routines. A keyboard printer unit 13 is provided for a hard copy printer from either one of the processors 1, 2.

For the architecture of the prior-art data processing system shown in FIG. 1, both processors 1 and 2 are connected by a selectable switch means to the single data bus link 12 coupling all of the peripheral units, including the main memory 3. Any failures in the data processing link anywhere along the bus 12 will result in a shutdown of the entire system, regardless of which processor is connected to the data bus.

The prior-art well-logging data processing system of FIG. 1 requires a substantial amount of processor software overhead in order to handle the communications between the processor and the various peripherals. With the basic limitation of the data transfer rate over the single data link, the data processing system is limited in its ability to handle a large number of tools traversing the borehole at the same time, and still do meaningful data processing on the measurements to produce the desired field logs of the well parameters. The data processing system of the present invention has solved these problems.

The Well-Site Data Processing System of the Present Invention

Figure 2:
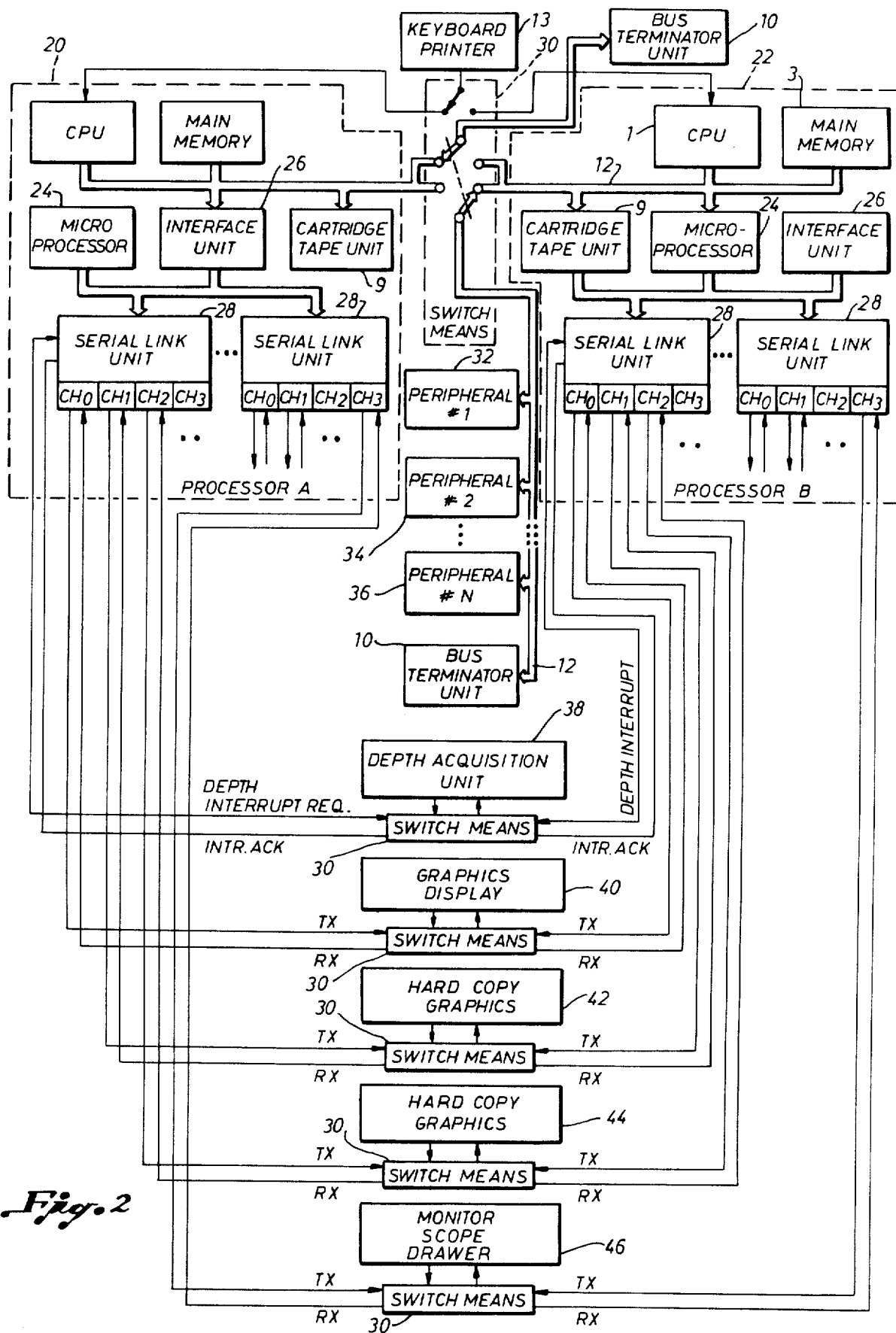
FIG. 2 is a block diagram of the present invention showing dual host processor units connected by a single data bus to a first plurality of peripheral units and by serial link channels to a second plurality of peripheral units.

Referring now to FIG. 2, there is shown a functional block diagram of the well-site data processing system of the present invention in which the plurality of peripheral units have been segregated into two separate groups. One group of peripherals are connected to one or the other of a pair of parallel redundant processor units 20, 22 by a single data bus link 12. Connection to bus 12 is thru switch means 30.

Switch means 30 connects either the data bus 12 of processor 20 or the data bus 12 of processor 22 to the data bus 12 interconnecting the first group of peripheral units. The bus terminating unit 10 is provided at the far end of data bus 12 from the peripheral units. As in the case of the prior-art well-site data processing system illustrated in FIG. 1, the central processing units 1 or 2 of the present invention will transfer data for the first group of peripheral units using standard data bus 12 communication techniques.

Still referring to FIG. 2, a second group of peripheral units, the depth acquisition unit 38, the graphics display 40, the hard copy graphics unit 42, the hard-copy graphics unit 44 and the monitor scope drawer 46 are each shown connected to both processor units 20 and 22 over separate parallel redundant data links. These serial data links originate with a plurality of serial link units 28 which are contained in both processor units 20 and 22. A more detailed description of the architecture of each of the processor units 20, 22 is given below with respect to the description of FIG. 3.

As shown in FIG. 2, a switch means 30 is provided between the serial data links from both processor units 20, 22 to the respective peripherals in the second group. The switch means 30 functions to enable access to each peripheral in the second group from either processor. Unlike the situation with respect to the prior-art data processing system shown in FIG. 1, a failure in the single data bus 12 linking the processor units 20, 22 with the plurality of peripherals in the first group will not cause the entire system to be shut down. A shut down will occur only with respect to the processor-to-peripheral data transfers for the first group of peripherals. Data communication can still be obtained between the backup processor 20, 22 and any one or all of the peripherals in the second peripheral group.

It has been found that the architecture of the present invention for dividing the peripherals into two different peripheral groups with different data transfer links between an operating processor unit 20, 22 and the peripherals has resulted in significant improvements in the rate of data transfers between the processor and peripherals. It has been found that the serial link data units operating in conjunction with the microprocessor unit 24 and processor interface unit 26 offer significant advantages as far as the effective rate of data transfers between processor and peripheral.

Additionally, significant improvements result when all of the peripherals are connected to the pair of redundant processor units 20, 22 through redundant pairs of serial data links. In other words, by eliminating the single interconnecting data bus 12 and placing all of the peripheral units on a serial link channel, the software overhead for communicating between the processor and the peripheral units is significantly reduced. This reduction in the software overhead enables the processor to perform more involved operations on the logging tool data, as well as increasing the number of tools and the speed with which a logging run may be made over what was heretofore possible with the prior art well-logging data processing systems.

The Host Processor Architecture

Figure 3:
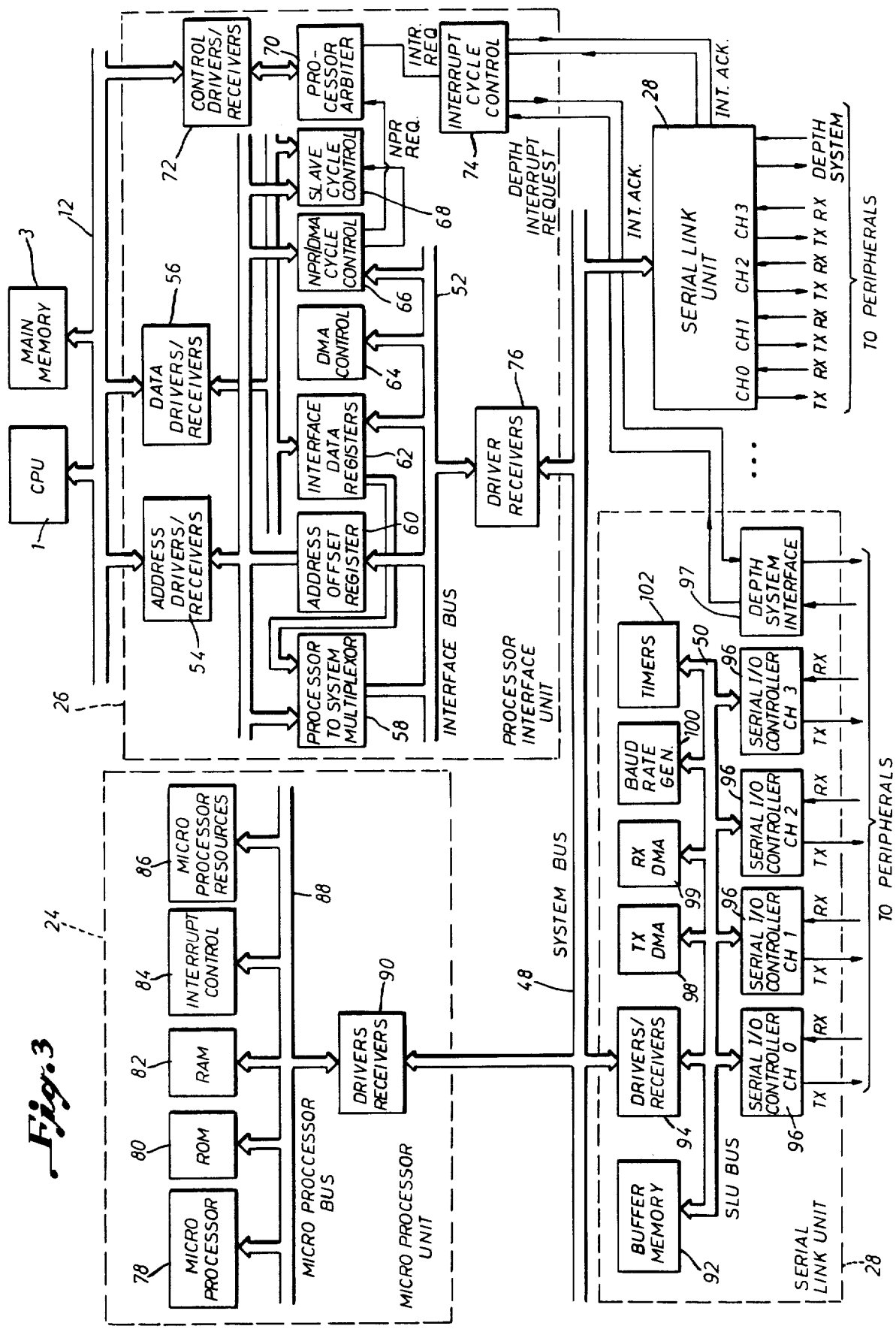
FIG. 3 is a functional block diagram of a host computer having serial link units as shown in FIG. 2.

Turning now to FIG. 3, there is shown a more detailed functional block diagram for either processor unit 20, 22 shown in FIG. 2. Each processor unit 20, 22 comprises a central processing unit 1, a main memory unit 3, a processor interface unit 26, a microprocessor unit 24 and a plurality of serial link units 28. The main memory 3 and processor interface unit 26 are connected to the central processing unit 1 by a processor bus 12. The microprocessor unit 24, the processor interface unit 26 and the plurality of serial link units 28 are each interconnected by a system bus 48.

Contained internal to the processor interface unit 26 is an interface bus 52 which interconnects the various circuit resources which comprise the processor interface unit 26. Internal to the microprocessor unit 24 is a microprocessor bus 88 which interconnects the resources of the microprocessor unit. In a similar manner, internal to each of the serial link units 28 is a serial link bus 50 which interconnects the resources of a serial link unit.

The microprocessor units 24, the processor interface unit 26 and the plurality of serial link units 28 function as a high performance front-end controller that is highly suited to a distributed processing environment. Communications between the central processing unit 1 and the peripherals connected to the serial link units is the function of the processor interface unit 26, the microprocessor unit 24 and the serial link units 28, acting together.

The host computer 1 creates a message for a peripheral and places the message in its main memory 3. The host computer then points the microprocessor unit 24 to the message block and commands that the message be sent to the peripheral. The host can then continue to process other information while the serial transmission of the message occurs by cycle stealing from the central processing unit 1. A similar process is used in the reverse direction when the peripheral wants to forward a message to the host processor 1. This high performance front-end controller significantly reduces the host computer overhead software involving communications with the system peripherals.

Still referring to FIG. 3, the processor interface unit 26 is shown connected to both the processor bus 12 and the system bus 48. The primary functions of the processor interface unit 26 are to transfer data contained in the main memory unit 3 to the buffer memory 92 which is contained on each of the plurality of serial link units 28, and to transfer data between the main memory 3 and the memory 82 of the microprocessor unit 24. These functions are similarly performed for data transfers occurring in the opposite direction, from peripheral-to-processor.

The processor interface unit 26 includes a processor-to-system multiplexer 58 which enables data information received from the data driver/receiver circuits 56 to be passed to the interface bus 52 and on down to the system bus 48. The driver/receiver circuit 76 function to interface the signals of the interface bus 52 to the system bus 48.

Also included in the processor interface unit 26 is an address offset register 60 which functions to create the proper main memory 3 address for loading and retrieving message data information. The interface data registers 62 comprise temporary holding registers for information which is being transmitted between peripherals and the main memory, both ways.

Controlling the transfer of data between the main memory 3 and the buffer memories 92 of the serial link units 28 is the DMA (Direct Memory Access) control 64 and the non-processor request cycle (NPR) control 66, both operating in conjunction with the slave cycle control 68. For the preferred embodiment of the present invention, CPU 1 (and CPU 2) is a Digital Electronics Corporation (DEC) PDP-11 computer. The slave cycle control unit 68 refers to a feature of DEC's Unibus which occurs for any data transfer over the bus. The NPR cycle refers to a non-processor involved interrupt in which the central processing unit 1 is involved in no way with the transfer of information to and from the main memory 3 over the processor bus 12. Transfer of data occurs by the above mentioned cycle stealing.

The DMA control 64 operates to transfer data contained in the interface data register 62 to the buffer memory 92 of the serial link units 28 or the RAM 82 of the microprocessor unit 24. This function is performed in both directions.

An example of how a message data transfer occurs between the host computer 1 and a peripheral unit connected to a serial link unit is given below.

Still referring to FIG. 3, the microprocessor unit 24 has a typical microprocessor architecture. A microprocessor chip 78 is interconnected by a microprocessor bus 88 to a read only memory (ROM) 80, a random access memory (RAM) unit 82, an interrupt control unit 84 and other microprocessor resources 86. The microprocessor unit 24 is coupled to the system bus 48 by a set of driver/receivers 90.

Each of the serial link units 28 is coupled to the system bus 48 by a set of driver/receivers 94. Connected to the driver/receivers 94 is the serial link bus 50 that interconnects the plurality of functional elements which comprise the unit. These elements include the buffer memory 92 for storing the message data to and from the peripherals, a transmit (TX) direct memory access unit DMA 98, and a receive (RX) direct memory access DMA 99. The TX and TX DMA units together control the transmit and receive functions for each of the plurality of serial data channels contained on a serial link unit 28. For, the presently preferred embodiment, there are four serial link channels provided on each serial link unit 28. Each of these plurality of serial data channels has an associated serial I/O controller 96 for supervising the transfer of data over the serial data link. Each of the serial I/O controllers 96 are coupled to the serial link bus 50. To control the bit rate, or baud rate, at which information is transmitted over the serial link channels, a baud rate generator 100 is provided. A set of timers 102 is also provided for various timing functions to permit the serial link 28 to communicate with the microprocessor unit 24 and the processor interface unit 26.

The microprocessor unit 24 executes the serial link unit application programs and provides initialization of the DMA controllers 98, 99 contained in the plurality of serial link units 28 and the DMA controller 64 contained on the processor interface unit 26. Initialization is also provided for the serial I/O controllers 96 contained in the plurality of serial link units 28 and the transmission clock frequencies generated by the baud rate generator 100. The microprocessor unit 24 monitors the serial link unit error conditions and status registers.

The Processor Interface Unit 26

Figure 4B:
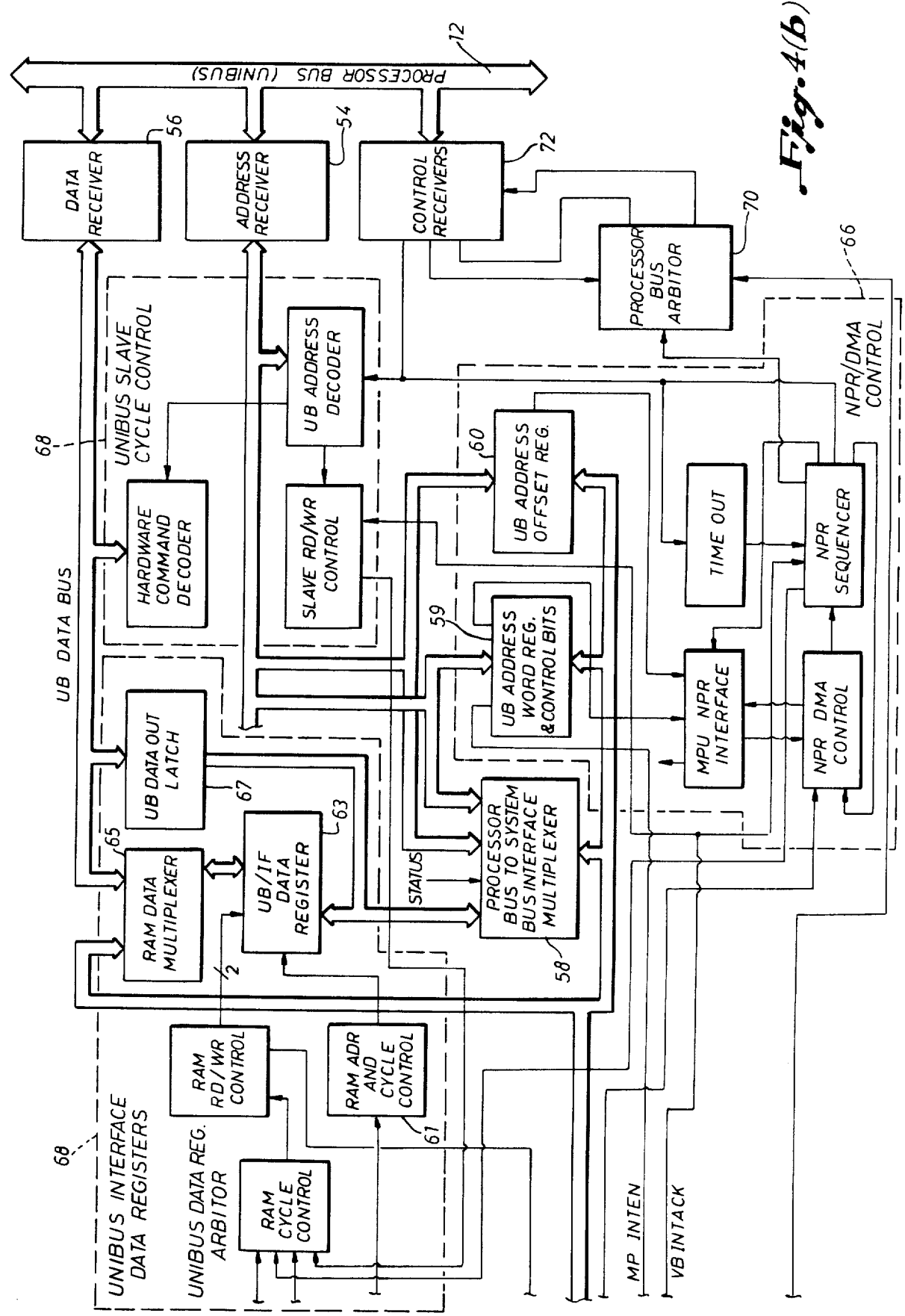
FIGS. 4(a) and (b), with the latter to the right of the former, forms a more detailed functional block diagram of the processor interface unit shown in FIGS. 2 and 3.

Turning now to FIG. 4(a) and 4(b), there is shown, when the latter is placed to the right of the former, a detailed functional block diagram of the circuits of the processor interface unit 26. As previously mentioned, the preferred embodiment of the present invention uses Digital Equipment Corporation PDP-11 series computers, and accordingly, the processor bus 12 is the Unibus data bus, as it is commonly known in the art. As a result, several of the signals of this detailed description bear designations and identifiers which are used in conjunction with DEC's Unibus. It is obvious, however, that if a different manufacture's central processor 1 is used in place of the DEC PDP-11, the signals and bus 12 protocols could necessarily be different.

The processor interface unit 26 contains the hardware required to communicate with the central processing unit 1 over the processor bus 12. The processor interface unit 26 also contains the following resources necessary for communications with the plurality of serial link units 28 over the system bus 48: (1) an interface data register arbitration unit 61, (2) interface data registers 62, (3) a slave cycle control 68, (4) an interrupt cycle control 74, (5) an NPR/DMA cycle control, and (6) a bus arbitrator unit 70. Access of the cycle controllers 66, 68 and 74 are controlled by the bus arbitration unit 70 and the interface data register arbitration unit 61, both of which are under the overall control of the microprocessor unit 24.

Interface Data Register Arbitration Unit 61

Still referring to FIGS. 4(a) and 4(b), the data register arbitration unit 61 controls accesses for reading or writing of the data registers 63, which are part of the interface data registers 62. There are five types of read/write cycles, two for microprocessor unit 24 accesses, namely, the microprocessor 78 and DMA controller 64 accesses. The other three cycles are the slave cycle, the interrupt cycle and the NPR cycle. The microprocessor 78 cycles are multiple clocks in length while the slave, interrupt and NPR cycles are only one clock long.

The data register arbitration unit 61 also controls the register address lines to the random access memory data registers 63. For the present invention, data register 63 comprises a 16-word by 16-bit random access memory unit.

The slave cycles address the lower four registers in data registers 63. The interrupt cycles address the top eight registers. The NPR cycles address the second four registers from the bottom just above the registers for the slave cycles. The DMA cycles also address the same four registers as the NPR cycles. Microprocessor 78 addresses all sixteen registers.

The data register arbitration unit 61 also controls the write strobe to the data registers 63. The write strobe is synchronized with the control lines and a 10 Mz system clock. Two write strobes are produced, one for the upper byte and one for the lower byte. As shown in FIG. 4(b) the data to the data register 63 can come from the data transceivers 56 connected to the processor bus 12 or from the data lines of the interface bus 52, which itself can have several different sources. In this way, data may be transferred to the data registers 63 from the peripherals on its way to the host computer or from the host computer on its way to the serial link units or microprocessor unit 24.

Bus Interface Registers 63

The data registers 63 are each composed of 16-bits. The input data lines to the registers 63 are connected from the data multiplexer 65. Data multiplexer 65, under the control of the data register arbitration unit 61, determines which data bus will provide the input data for the registers. The interface bus 52 is selected as input during microprocessor unit 24 and DMA cycles. The data from data receivers 56 connected to processor bus 12 are selected as input to the data registers 63 during slave and NPR cycles. During NPR cycles, data is being transferred between the main memory 3 of the central processing unit 1 and the data registers 63, while the microprocessor unit 24 and DMA cycles are transferring data between the buffer memories 92 of the serial link units or the microprocessor unit memory 82 and the data registers 63.

The outputs from data registers 63 are connected to the data latch 67 for temporary storage, and to a data multiplexer 58. Data multiplexer 58 interfaces the output of data registers 63, the output of the address word and status register 59, and the output of the address offset register 60, all to the interface bus 52.

The data registers 63 may be word or byte addressed, but most of the time word addressing is used. The microprocessor unit 24 and DMA controller 64 treat the data registers 63 as I/O addresses. The processor bus 12 views the data registers 63 as four I/O registers, a command register, a status register, a request register, and a sense register. The interrupt registers 71, 73 and 75 and NPR registers 59 and 60 are indirectly accessed from the processor bus 12 standpoint. A discussion of how these registers are referenced is provided in the section on the interrupt cycle control and the NPR cycle control given below.

Slave Cycle Control 68

Still referring to FIGS. 4(a) and (b), the serial link units 28 appear to the central processor unit 1 as four I/O registers. They are the command, status, request, and sense registers. The request and sense registers are used by diagnostic software. The command register is used by the central processor 1 to begin serial link unit operations. The central processor 1 uses the status register to determine the various states or conditions of the serial link units, such as the idle or active state of the serial channels.

A slave cycle begins whenever the host computer 1 reads or writes to the serial link unit registers. The slave cycle is the same regardless of which register is accessed. During a slave read operation, the processor bus 12 address is decoded by the slave cycle control 68. The slave cycle control 68 then makes a request to the interface data register arbitration unit 61. After any current data register cycles are completed, the arbitration unit 61 allows the processor bus 12 to access the data registers 63. The content of the data register is output through a data latch to the Bus data driver/receivers 56, and slave sync (SSYN) is asserted to end the slave cycle.

Writing to the interface data registers 63 is a similar procedure to the read operation. The slave cycle control 68 decodes the address received from the address driver/receivers 54, and then requests access to the data register 63. The data register arbitration unit 61 grants access and begins a write cycle. The processor bus 12 data passes through the data driver/receivers 56 and the data multiplexer 65, and is loaded into the data register 63. SSYN is then asserted to terminate the slave cycle.

Interrupt Cycle Control 74

The processor interface unit 26 has eight interrupt vector registers, 71, 73, 75. Four of these registers 71 are used by the serial channels and the other four 73, 75 are dedicated to the depth systems for up and down interrupts. The registers are accessible to the serial link units 28 for the purpose of holding the interrupt vectors of routines for devices requiring service.

The interrupt cycle controller 77 maintains the priorities of the interrupts automatically. Interrupts are initiated in two ways, an interrupt from a depth channel or a peripheral interrupt. For a depth interrupt, prior to enabling the depth system interrupts, the microprocessor unit 24 must load the proper vector values into the interrupt vector data registers located in data register 63. The microprocessor unit 24 requests access to the data register 63. The data register arbitration unit 61 starts a write cycle. The microprocessor unit 24 places the vector data on the system bus 48 which applies the vector data to the interface bus 52. This vector data then passes through the data multiplexer 65 and into the data register 63.

After the depth interrupts are enabled by the microprocessor unit 24 at the request of the central processing unit 1, the interrupt controller 77 is now under control of the depth system and the peripherals, and the microprocessor unit 24 does nothing further to support it. When a depth interrupt is received on the depth interrupt lines, the interrupt cycle control 74 outputs signals to the data register arbitration unit 61 telling the unit which vector register is going to be used during the interrupt cycle.

Meanwhile, the interrupt cycle controller 74 has also requested the bus arbitration unit 70 to generate a bus request to the central processing unit 1. The data register arbitration unit 61 and the interrupt cycle controller 77 have the register address latched while waiting for the interrupt cycle to start. When the bus 12 bus grant (BG) comes in, the data register arbitration unit 61 starts into the interrupt cycle and places the contents of the data register 63 currently being addressed into the data latch 67. From there the data is output to the driver/receivers 56 and an interrupt INTR is asserted on the processor bus 12. The processor unit 1 reads the vector data and asserts SSYN to end the interrupt cycle.

A peripheral interrupt sequence occurs in much the same way, except the vector registers are not preloaded with vector data. The peripheral interrupt cycle starts when the microprocessor unit 24 writes a peripheral interrupt vector into the data register 63. The data register arbitration unit 61 sends an interrupt request to the interrupt cycle controller 74. The interrupt cycle controller 74 tests for priority, and then tells the data register arbitration unit 61 to latch the address of the register for the data register 63 which contain the interrupt vector. The interrupt cycle controller 77 also tells the bus arbitration unit 70 to generate a bus request to the central processor unit 1.

When the central processor 1 grants control of the processor bus, the data register arbitration unit 61 starts into an interrupt cycle and places the contents of the addressed register into the latch 67. The central processor 1 then reads the vector from the processor bus 12 and asserts SSYN to end the interrupt cycle.

NPR/DMA Cycle Control 66

The basic operations of the NPR/DMA cycle control 66 for reading or writing a word of data is the same whether or not the single word mode or block transfer mode is selected. The logic of the NPR/DMA cycle control 66 moves a word of data (16 bits) between the data registers of data registers 63 dedicated to the NPR operations and the word of main memory 3 addressed by the 18-bit address register 60. The NPR/DMA cycle control 66 then waits for the NPR data register in the data register 63 to be emptied or filled. The address register 60 may be automatically incremented to the next word address after the transfer period.

The processor interface unit 26 also contains a DMA controller 64 (see FIG. 4(a)). For the presently preferred embodiment, DMA control 64 is an Intel Model 8237-2 DMA controller. The function of the DMA controller 64 is to move data from/to the NPR registers contained in the data registers 63 across the system bus 48 to/from the buffer memories 92 contained in the serial link units 28. The DMA controller 64 is utilized in a word transfer mode versus the DMA controllers 98, 99 on the serial link units 28 which transfer only bytes. Since the DMA controller 64 transfers data across the system bus 48 to the serial link units 28, the processor interface unit 26 must become system bus 48 master. All NPR transfers are initiated by the microprocessor unit 24.

The NPR/DMA cycle control 66 begins operating as soon as it is enabled. Certain control registers must be set up by the microprocessor unit 24 prior to enabling the NPR/DMA cycle control 66. The page number register 59 contains the upper address bits (A17 and A18) of the processor bus 12 address. This register also controls which way the data will flow, either from serial link units 28 to central processing unit 1 memory 3, or vice versa. The address register 60 must be loaded with the lower 15 bits of the processor bus 12 address. Register 60 automatically increments by even addresses after each NPR transfer cycle. The interface control register (page number register) 59 is set to enable DMA access to the data registers 63. An enable to the NPR/DMA cycle control 66 is contained in the data stored in this register.

The DMA controller 64 must also be set up with the address of the serial link unit buffer memory 92 address and the data register port address. The DMA controller 64 is also programmed with the number of words to transfer and the direction in which to transfer them, either serial link unit buffer 92 to data registers 63 or data registers 63 to buffer memory 92.

The microprocessor unit 24 enables the NPR/DMA cycle control 66 to generate the appropriate cycle. This logic must decide which part of the cycle to begin first. The direction of the data transfer determines this. If the direction of transfer is from serial link unit 28 to central processor 1 main memory 3, the NPR/DMA cycle control 66 enables the DMA controller 64 to move one word from the buffer memory 92 on the serial link unit 28 into the data registers 63. When the DMA cycle is complete, the NPR/DMA cycle control 66 request the bus arbitration unit 70 to acquire the processor bus 12 for an NPR transfer.

After the arbitration unit 70 indicates that the serial link unit has become processor bus 12 master, the contents of the page number register 59 and the processor bus 12 address register 60 are placed onto the processor bus 12. The NPR/DMA cycle control 66 then accesses a register in the data registers 63 and places its contents on the processor bus 12. This data is written into main memory 3. When SSYN is returned from the central processor 1, the NPR/DMA cycle control 66 completes the cycle and returns to the decision state. If multiple words are to be transferred, the DMA controller 64 is started again and the entire cycle repeats until the message is completely transferred to the main memory 3.

The NPR/DMA cycle control 66 works in a similar manner when the direction of data transfer is from main memory 3 to a serial link unit. The NPR/DMA cycle control 66 requests the bus arbitration unit 70 to acquire bus mastership of the processor bus 12. The contents of the bus page number register 59 and the address register 60 are then used to form the processor bus 12 address. The NPR/DMA cycle control 66 then starts the data register arbitration unit 61 into a write cycle, and the data is read from the main memory 3 and placed into the data registers 63. When SSYN is returned from the central processor 1, the NPR half of the cycle ends. The NPR/DMA cycle control 66 then starts the DMA controller 64. The DMA controller 64 accesses the data registers 63 and moves the contents of the addressed register to the serial link buffer memory 92. When the DMA controller 64 is finished with the transfer, the NPR/DMA cycle control 66 enters the decision state again. If multiple words are to be transferred, the entire cycle will repeat until the message has been transferred to the serial link unit 28 buffer memory 92.

Single word NPR transfers take place without the use of the DMA controller 64. The microprocessor unit 24 reads or writes data into the data registers 63 for single word NPR transfers, however, the cycle is the same as multiple word transfers.

Bus Arbitration Unit 70

The bus arbitration unit 70 controls the interrupt hand shaking with the central processor 1. The arbitration unit 70 occupies two priority levels on the processor bus 12. They are BR6/BG6 and NPR request/grant. When interrupts are enabled and an interrupt request is issued, the arbitration unit 70 sends a bus request, BR6, to the processor bus 12. The central processor unit 1 arbitration logic decides on the priority of the incoming processor bus 12 requests. The central processor 1 asserts a bus grant, BG6, to the processor interface unit 26. This signal tells the processor interface unit that it will be the next device to become bus master.

The arbitration unit 70 receives the bus grant and checks for a pending bus request, BR6. If there is no pending request, the arbitration unit 70 asserts the grant line, BG6, so that the next requesting peripheral connected to the processor bus 12 may see it.

When the arbitration unit 70 receives a bus grant and a bus request is pending, an interrupt cycle is started. The arbitration unit 70 asserts slave acknowledge (SACK) which tells the central processor 1 that the bus grant has been taken. The central processor 1 or current bus master finishes a processor bus cycle and drops bus busy (BBSY). The central processor 1 now drops the bus grant signal when SACK is received. At this point, the interrupt cycle control 74 asserts BBSY and the processor interface unit 26 becomes bus master.

The interrupt vector data is moved from the interface data registers 63 through the data latch 67 and placed on the processor bus 12. The arbitration unit 70 now assert the interrupt signal INTR to notify the central processor 1 that vector data is available on the processor bus 12. The central processor 1 reads the vector data and asserts SSYN. When the arbitration unit 70 receives SSYN, the vector data is removed from the processor bus 12. The cycle ends when the INTR signal is dropped and BBSY is dropped releasing the processor bus 12 for some other peripheral to become bus master.

The arbitration logic 70 handles an NPR cycle in a similar method. The arbitration unit 70 receives an NPR request from the NPR/DMA cycle control logic 66. The arbitration logic 70 then asserts NPR to the central processor 1 to request control of the processor bus 12. The central processor 1 then returns a grant, NPG, and the arbitration unit 70 checks for a pending NPR request. If no request is pending, the arbitration logic 70 asserts the NPG line for the next requesting peripheral.

If an NPR request is pending, the arbitration logic 70 asserts SACK to notify the central processor 1 that the grant has been taken. The arbitration logic 70 then drops the NPR request line and waits for BBSY to go inactive. The arbitration logic 70 then asserts BBSY and the processor interface unit 26 becomes bus master. The NPR/DMA cycle control logic 66 transfers one word of data. After the data word has been transferred, the NPR/DMA cycle control logic 66 drops BBSY to release the processor bus 12. This process is repeated until the entire message has been transferred.

A Serial Link Unit 28

Turning now to FIG. 5, there is shown a more detailed functional block diagram of a serial link unit 28. For the preferred embodiment of the present invention, two serial link units 28 are provided. Each serial link unit 28 supports four serial data channels for a total capability of eight serial channels. Each channel is capable of operating simultaneously at 333 Kbits per second per channel. Higher data rates are possible for a given channel when the number of channels permitted to transmit data are reduced.

Figure 6:
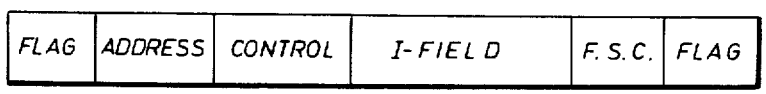
FIG. 6 is an illustration of the structure of an SDLC frame for transmission of serial data between a serial link unit and a serial peripheral unit.

The serial protocol for the data transmitted over a serial communications data link is an implementation of the IBM Serial Data Link Control (SDLC) protocol. This protocol provides for serial-by-bit information transfer and includes comprehensive error detection and recovery procedures. FIG. 6 is a block diagram representation of a SDLC frame showing the format of the bits in each frame.

Each serial link unit 28 has the hardware to support four serial channels of data and a direct interrupt to the host CPU 1 from one source. This source is the depth interrupts coming from a device measuring longitudinal displacement of the logging tools traversing the well borehole. Each serial link unit 28 also contains a baud rate generator 100 for each channel supported by the serial link unit, a set of general purpose timers 102, 16 K-bytes of buffer memory 92, four serial I/O SDLC controllers and RS-422 interfaces 96, independent hardware full duplex DMA data transfer units 98, 99 for each channel and a depth system interrupt interface 97.

Baud Rate Generator 100

The baud rate generator 100 is comprised of two programmable interval timers. For the presently preferred embodiment, the programmable interval timers were manufactured by Intel as their 8253-5 counter/timers. The counters are used in a squarewave generator mode, mode 3. While in mode 3, the microprocessor unit 24 loads a value into the counter registers. The output frequency of the timer is determined by dividing the input clock frequency by the value loaded into the counter register.

The output frequencies of each counter are assigned to a single serial channel for use as the transmission clock. The transmission clock is sent to the peripheral along with the transmitted data. The peripheral's transmit clock and data are used by the serial link unit 28 as the receive clock to receive data for that channel. This means that the serial transmission rates for transmit and receive can be different and that the clock frequency is not critical—a 10% tolerance at the maximum rate with greater tolerances at slower rates.

General Purpose Timers 102

Counter 0 of each Intel Model 8253-5 counter/timer used in the baud rate generator 100 is used for general purpose timing. Counter 0 is programmed to operate as a divide by "N" counter, mode 2, where "N" is the number loaded into the counter register. The output frequency is determined by dividing the input clock frequency by the number loaded in to the counter register. The assignments of the general purpose timers are implemented by the software of the microprocessor unit 24.

Buffer Memory 92

For the presently preferred embodiment there are 32 4K × 1 static RAM chips used to create the buffer memory 92. The buffer memory 92 may be byte or word addressed. The four serial channels on a single serial link unit 28 share the buffer memory. The entire buffer memory 92 is hardware accessible by each of the serial channels; therefore, buffer memory management is provided entirely by the software. The buffer memory 92 is byte accessible by the four serial channels and by the microprocessor unit 24 and the processor interface unit 26.

Serial I/O Controllers 96

Each serial channel on a serial link unit 28 has a dedicated SDLC controller and interface 96 for transmission of data to and from a peripheral device. For the presently preferred embodiment each serial controller 96 is a Western Digital Model SD 1933A SDLC controller. Each controller 96 performs the serial-to-parallel and parallel-to-serial conversion, the SDLC 0 bit stuffing, and SDLC frame error checking. Since each serial channel operates in the full duplex mode (simultaneously receiving and transmitting), each channel consists of two independent data channels, receive RX and transmit TX. There is a small amount of shared common logic between these two channels. The RS-422 interface is composed of differential drivers and receivers because of their high noise immunity.

TX and RX DMA Controllers 98 and 99

Still referring to FIG. 5, there are two DMA controllers on each serial link unit 28, one for transmit (TX) and one for receive (RX). For the presently preferred embodiment, each DMA controller is an Intel Model 8237-2 DMA controller. The TX DMA 98 is dedicated to moving data from buffer 92 to the transmit data ports of the each of the four serial channels on each serial link unit 28. The RX DMA controller 99 is dedicated to moving data from the receive ports of each of the four serial data channels into the buffer memory 92. Each DMA controller 98, 99 contains registers associated with each of the four serial channels supported by a serial link unit 28. The four channels of DMA contained in both the TX DMA controller 98 and RX DMA controller 99 operate on a dynamic priority basis. The most recently serviced channel has the lowest priority as between the four channels supported by each of the controllers. In other words, the last channel serviced will be the last to be serviced again.

Bus Control and Arbitration Within the Serial Link Unit 28

The serial link bus 50 is the address, data, and control bus on the serial link unit which operates separately from the system bus 48. Data bus driver/receivers 94 interface the system bus 48 to the serial link bus 50. Each serial link unit 28 has its own separate serial link bus 50, and is not common to any of the other serial link units. The system bus 48 masters may request the use of a serial link bus 50 in a serial link unit 28 when interboard transactions are to take place.

The TX DMA controller 98 and RX DMA controller 99 must share the serial link bus 50 with each other and also with any offboard system bus 48 masters. Control of the serial link bus 50 on a given serial link unit is granted to either of the DMA controllers 98, 99 or a system bus 48 master by the bus arbitration unit 104 which gives priority to any system bus 48 master over the DMA controllers 98 or 99. Priority for control of the serial link bus 50 as between the two DMA controllers 98, 99 is also on a priority basis. The priority alternates between the two controllers, first one, then the other.

A Serial Message Data Transfer—Processor-to-Peripheral

Data transfers between main memory 3 of central processor 1 and a peripheral connected to a serial link unit 28 is basically a three-step process. In the first step, data is moved from the main memory 3 to the data registers 63 in the processor interface unit 26 by non-processor DMA (NPR) processor bus 12 transfers. The data contained in the data registers 63 is then moved to the serial link unit 28 buffer memory 92 via DMA transfers under control of the DMA 64 in the processor interface unit. As previously mentioned, the DMA controller 64 contained on the processor interface unit 26 is orginally set up by the microprocessor unit 24. The data in the serial link unit 28 buffer memory 92 is then moved to the serial channel servicing the peripheral unit by way of TX DMA data transfers. The data transfers from the peripherals to the main memory 3 simply reverse the process.

Figure 7:
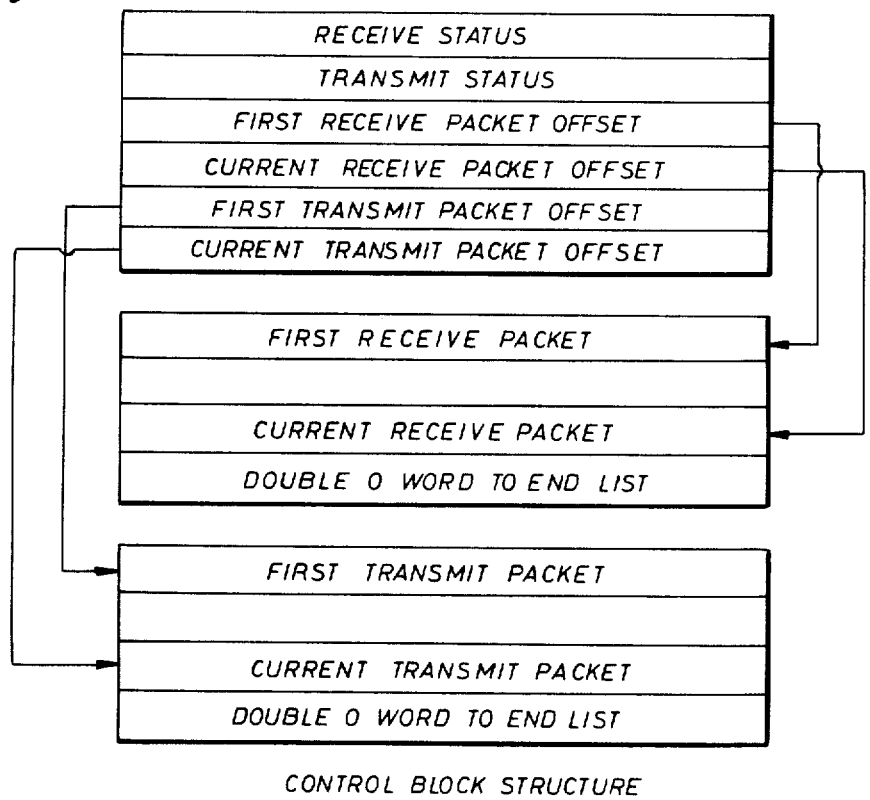
FIG. 7 is a block diagram of the structure of the message control blocks in the main memory of the central processor 1.

The processor interface unit 26, microprocessor unit 24 and each of the eight serial channels of the serial link units have a channel control block in main memory 3 assigned to them. These control blocks contain control and status information relative to the messages being exchanged with the peripherals connected to the serial link units. FIG. 7 illustrates the contruction of the control blocks. The offset data illustrated in FIG. 7 are used as pointers to other areas of the control block. The message packets in the control block contain the message status and the address of the beginning of the message block.

Figure 8:
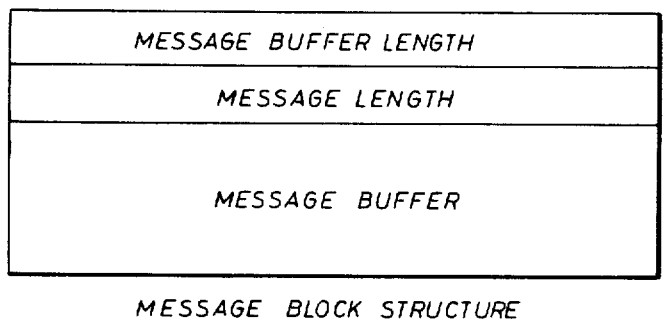
FIG. 8 is a block diagram of the structure of a typical message block in the main memory of the central processor 1.

Turning now to FIG. 8, there is shown an illustration of a typical message block structure. There may be an unlimited number of message blocks at any given time resident in the main memory 3. The microprocessor unit 24 and processor interface unit 26 use a message block only when it is pointed to by a message packet (see FIG. 7). All message blocks have the same structure, a message header composed of a word giving the buffer length followed by a word giving the message length. This header is followed by the message text.

Before any messages can be transferred between the central processor 1 and a serial peripheral, the serial link units 28 and the central processor 1 must determine the system configuration. That is, the system must determine which peripherals are connected to which serial link unit 28 channels. When the system configuration has been determined, the central processor 1 then issues an "initialized channel n" command for each serial channel that will be used. This gives the serial link units the address of the channel control block for that serial channel (for that peripheral) and instructs the serial link units 28 to begin the continual polling process on that channel.

When the host is ready to send a message to a peripheral, it sends a "transmit channel n" command to the processor interface unit 26. This command is stored in the data register 63. The processor interface unit 26 then issues an interrupt command to the microprocessor unit 24 for the purpose of indicating that the processor interface unit has received information from the central processor 1.

The microprocessor 24 then transfers the data from the date registers 63 to its own memory. The microprocessor unit 24 determines from this data which tables in the main memory 3 are to be examined. Under control of the microprocessor 24, the necessary pointers and counter information is supplied to the data registers 63 of the processor interface unit 26 so that the contents of the tables can be downloaded to the microprocessor unit 24. This downloading of the contents of the main memory 3 is under NPR cycles.

The microprocessor unit 24 now examines the down loaded data. The information of where the message is stored in the main memory 3 is then forwarded to the processor interface unit 26 so that the process of transferring the message data from the main memory 3 to the appropriate buffer memory 92 can occur. The determination of how much of the message to get each time and where to load that data in the serial link unit buffer memory 92 is under control of the microprocessor 24.

After setting up the necessary pointers and counter values in the processor interface unit 26 data registers 63, the microprocessor 24 then goes idle and the transfer of the message occurs under control of the NPR/DMA cycle control 66 contained in the processor interface unit 26. At the completion of the transfer of the message data to the serial link unit buffer memory 92, the processor interface unit 26 interrupts the microprocessor unit 24.

The microprocessor unit 24 then checks to see if everything transferred okay, and if so, then sets up and initiates the transfer of the data contained in the serial link buffer memory 92 to the particular serial channel to receive the message. Transfer of the data from the buffer memory unit 92 to the serial channel is under control of the TX DMA controller on the appropriate serial link unit 28. The serial link unit 28 interrupts the microprocessor unit 24 when the last byte of the message has been transmitted.

If there are further segments of the message to be transmitted, the microprocessor would then initate the above process for having the next block of data transferred from the main memory 3 to the transmit port of the serial channel in the serial link unit 28. A data transfer from the peripheral to the main memory 3 occurs in just the reverse direction but with the same basic operations.

Because of the segmented bus arrangement of the serial link buses 50; the bus arrangement between the microprocessor unit 24, the plurality of serial link units 28, and the processor interface unit 26; and, the bus arrangement between the central processor 1, the processor interface unit 26, and the peripherals connected to the process bus, the present invention is able to simultaneously transfer data to the peripheral of the system.

Data transfers can occur simultaneously over any one of several paths at the same time if the proper procedures have been met for establishing a valid data link.

These transfers could occur simultaneously between (1) the processor unit and a peripheral in a plurality of peripherals connected to the processor bus, (2) the processor unit and the interface unit, (3) the interface unit and the microprocessor unit, (4) the interface unit and one of the plurality of serial link units, (5) the microprocessor and one of the serial link units, and (6) each of the serial link units and any one of the peripherals connected to the plurality of serial data channels of the serial link unit.

As a result of these simultaneous data transfers, the data processing system of the present invention is able to substantially increase the data transfer rate to the peripherals and to decrease the amount of software overhead to handle these data transfers.

In describing the invention, reference has been made to this preferred embodiment. However, those skilled in the art and familiar with the disclosure of the invention may recognize additions, deletions, substitutions or other modifications which would fall within the purview of the invention as defined in the appended claims.

What is claimed is:

1. A data processing system including peripheral units connected thereto, said system comprising:
    (a) a central processor unit including a main memory;
    (b) a plurality of serial link units, each having a serial link bus and each having a plurality of serial data input/output channels connected to said serial link bus, each serial channel sending on transmit lines and receiving on receive lines serial data to and from a first plurality of the peripheral units;
    (c) a processor interface unit responsive to data ready signals from said processor unit and said serial link units, for controlling the transfer of data between said central processor unit and said plurality of serial link units, said interface unit including an internal interface bus; and
    (d) a microprocessor unit responsive to said processor interface unit and said serial link units for initiating the transfer of data between said plurality of serial link units and said processor interface unit, said plurality of serial link units enabling the simultaneous input/output transfer of data to a plurality of the peripherals in said first plurality of peripherals.

2. The processing system of claim 1 further including:
    (a) a processor bus interconnecting a second plurality of the peripherals units to said central processor unit for data transfers therebetween, said processor bus connecting said processor interface unit to said central processor; and
    (b) a system bus interconnecting said microprocessor unit, said processor interface unit and said plurality of serial link units for data transfers therebetween, said buses enabling the transfer of data to occur simultaneously over established data links between
        (i) said processor unit and a peripheral in said second plurality of peripherals,
        (ii) said processor unit and said interface unit,
        (iii) said interface unit and said microprocessor unit.
        (iv) said interface unit and one of said plurality of serial units,
        (v) said microprocessor and one of said plurality of serial units, and (vi) each of said plurality of serial link units and any one of the peripherals in said first plurality of peripherals connected to the plurality of serial input/output channels of said serial link unit.

3. The processing system of claim 1 wherein said processor interface unit includes:
   (a) a plurality of interface data registers connected to said processor bus for temporarily storing information being passed between said processor unit and said microprocessor unit or said plurality of serial link units;
   (b) a direct memory access unit responsive to said microprocessor unit for transferring data between said interface data registers and said serial link units; and
   (c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial link unit and vice versa.

4. The processing system of claim 3 wherein said transferring means obtains data from said main memory independently of processor control.

5. The processing system of claims 1, 2 or 3 wherein each said serial link unit comprises:
   (a) a message buffer memory connected to said serial link bus for temporarily storing incoming and outgoing message data for a peripheral connected to said serial link unit;
   (b) a receive direct memory access unit connected to said serial link bus for controlling the transfer of data between the receive lines of said plurality of serial input/output channels and said buffer memory;
   (c) a transmit direct memory access unit connected to said serial link bus for controlling the transfer of data between the transmit lines of said plurality of serial input/output channels and said buffer memory; and
   (d) a plurality of serial controllers each connected to said serial link bus and each associated with one of said plurality of serial input/output channels, each said controller supervising the exchange of data between the peripheral connected to the serial channel and said serial link unit.

6. The processing system of claim 5 further including a baud rate generator connected to said serial link bus for generating timing signals to determine the transmission rate of the serial data to said peripherals connected to said serial link unit.

7. The processing system of claim 5 wherein said transmit and said receive direct memory access units each comprise a plurality of direct memory access channels, one for each of said plurality of serial input/output channels of said serial link unit.

8. The processing system of claim 7 further including a bus arbitration unit for resolving access to said serial link bus between said direct memory access units and any data transfer to said serial link unit from said microprocessor unit or said processor interface unit.

9. The processing system of claim 8 wherein said direct memory access units alternate in priority as between themselves as to which access unit will obtain control of said serial link bus as determined by said bus arbitration unit, said plurality of direct memory access channels in each said access unit having a rotating priority therebetween where the channel last serviced has the lowest priority.

10. A data processing system including peripheral units connected thereto, said system comprising:
   (a) a central processor unit including a main memory;
   (b) a plurality of serial link units, each having a serial link bus and each having a plurality of serial data input/output channels connected to said serial link bus, each serial channel sending on transmit lines and receiving on receive lines serial data to and from said peripheral units;
   (c) a processor interface unit responsive to data ready signals from said processor unit and said serial link units, for controlling the transfer of data between said central processor unit and said plurality of serial link units, said interface unit including an internal interface bus; and
   (d) a microprocessor unit responsive to said processor interface unit and said serial link units for initiating the transfer of data between said plurality of serial link units and said processor interface unit, said plurality of serial link units enabling the simultaneous input/output transfer of data to a plurality of said peripherals.

11. The processing system of claim 10 further including a system bus interconnecting said microprocessor unit, said processor interface unit, and said plurality of serial link units, for data transfers therebetween, said buses enabling the transfer of data to occur simultaneously over established data links between
   (i) said processor unit and said interface unit,
   (ii) said interface unit and said microprocessor unit,
   (iii) said interface unit and one of said plurality of serial units,
   (iv) said microprocessor and one of said plurality of serial units, and
   (v) each of said plurality of serial link units and any one of said peripherals connected to the plurality of serial input/output channels of said serial link unit.

12. The processing system of claim 10 wherein said processor interface unit includes:
   (a) a plurality of interface data registers connected to said processor bus for temporarily storing information being passed between said processor unit and said microprocessor unit or said plurality of serial link units;
   (b) a direct memory access unit responsive to said microprocessor unit for transferring data between said interface data registers and said serial link units; and
   (c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial link unit and vice versa.

13. The processing system of claim 12 wherein said transferring means obtains data from said main memory independently of processor control.

14. The processing system of claims 10, 11 or 12 wherein each said serial link unit comprises:
   (a) a message buffer memory connected to said serial link bus for temporarily storing incoming and outgoing message data for a peripheral connected to said serial link unit;

(b) a receive direct memory access unit connected to said serial link bus for controlling the transfer of data between the receive lines of said plurality of serial input/output channels and said buffer memory;

(c) a transmit direct memory access unit connected to said serial link bus for controlling the transfer of data between the transmit lines of said plurality of serial input/output channels and said buffer memory; and (d) a plurality of serial controllers each connected to said serial link bus and each associated with one of said plurality of serial input/output channels, each said controller supervising the exchange of data between the peripheral connected to the serial channel and said serial link unit.

15. The processing system of claim 14 further including a baud rate generator connected to said serial link bus for generating timing signals to determine the transmission rate of the serial data to said peripherals connected to said serial link unit.

16. The processing system of claim 14 wherein said transmit and said receive direct memory access units each comprise a plurality of direct memory access channels, one for each of said plurality of serial input/output channels of said serial link unit.

17. The processing system of claim 16 further including a bus arbitration unit for resolving access to said serial link bus between said direct memory access units and any data transfer to said serial link unit from said microprocessor unit or said processor interface unit.

18. The processing system of claim 17 wherein said direct memory access units alternate in priority as between themselves as to which said access unit will obtain control of said serial link bus as determined by said bus arbitration unit, said plurality of direct memory access channels in each said access unit having a rotating priority therebetween where the channel last serviced has the lowest priority.

19. A well-logging data acquisition and processing system responsive to signals from well-logging tools contained in a well borehole drilled into the earth's formations, for obtaining well-site measurements from the tools and for generating output logs of well parameters determined from the measurements, the system having a plurality of peripherals units which include a logging tool interface unit, the system comprising:

(a) first and second parallel central processors, each including a main memory unit for storing program routines and for storing data comprising messages to and from a first plurality of peripheral units, each said processor including (i) a plurality of serial link units, each having a serial link bus and each having a plurality of serial data input/output channels connected to said serial link bus, each serial channel sending on transmit lines and receiving on receive lines serial data to and from said first plurality of the peripheral units, (ii) a processor interface unit responsive to data ready signals, for controlling the transfer of data between the central processor unit and said plurality of serial link units, said interface unit including an internal interface bus, (iii) a microprocessor unit responsive to said processor interface unit and said serial link units for initiating the transfer of data between said plurality of serial link units and said processor interface unit, said plurality of serial link units enabling the simultaneous input/output transfer of data to a plurality of the peripherals in said first plurality of peripherals, and (iv) a processor bus for data transfer between said central processor unit, its main memory, said processor interface unit, and a second plurality of said peripheral units; and (b) a switch means connected to said processor buses and the transmit and receive lines from each channel of each of said serial link units and responsive to a switch command for controlling which of said first or second processor units is connected to said peripherals for data transfers therebetween.

20. The processing system of claim 19 wherein each said central processing unit includes a system bus interconnecting said microprocessor unit, said processor interface unit and said plurality of serial link units for data transfers therebetween, said buses enabling the transfer of data to occur simultaneously over established data links between (i) said processor unit and said interface unit,
(ii) said interface unit and said microprocessor unit,
(iii) said interface unit and one of said plurality of serial units,
(iv) said microprocessor and one of said plurality of serial units, and
(v) each of said plurality of serial link units and any one of said peripherals in said first plurality of peripherals connected to the plurality of serial input/output channels of said serial link unit.

21. The processing system of claim 19 wherein said processor interface unit includes:

(a) a plurality of interface data registers connected to said processor bus for temporarily storing information being passed between said processor unit and said microprocessor unit or said plurality of serial link units;

(b) a direct memory access unit responsive to said microprocessor unit for transferring data between said interface data registers and said serial link units; and (c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial link unit, and vice versa.

22. The processing system of claim 21 wherein said transferring means obtains data from said main memory independently of processor control.

23. The processing system of claims 19, 20 or 21 wherein each said serial link unit comprises:

(a) a message buffer memory connected to said serial link bus for temporarily storing incoming and outgoing message data for a peripheral connected to said serial link unit;

(b) a receive direct memory access unit connected to said serial link bus for controlling the transfer of data between the receive lines of said plurality of serial input/output channels and said buffer memory;

(c) a transmit direct memory access unit connected to said serial link bus for controlling the transfer of data between the transmit lines of said plurality of serial input/output channels and said buffer memory; and (d) a plurality of serial controllers each connected to said serial link bus and each associated with one of said plurality of serial input/output channels, each said controller supervising the exchange of data between the peripheral connected to the serial channel and said serial link unit.

24. The processing system of claim 23 further including a baud rate generator connected to said serial link bus for generating timing signals to determine the transmission rate of the serial data to said peripherals connected to said serial link unit.

25. The processing system of claim 23 wherein said transmit and said receive direct memory access units each comprise a plurality of direct memory access channels, one for each of said plurality of serial input/output channels of said serial link unit.

26. The processing system of claim 25 further including a bus arbitration unit for resolving access to said serial link bus between said direct memory access units and any data transfer to said serial link unit from said microprocessor unit or said processor interface unit.

27. The processing system of claim 26 wherein said direct memory access units alternate in priority as between themselves as to which said access unit will obtain control of said serial link bus as determined in said bus arbitration unit, said plurality of direct memory access channels in each said access unit having a rotating priority therebetween where the channel last serviced has the lowest priority.

28. A well-logging data acquisition and processing system responsive to signals from well-logging tools contained in a well borehole drilled into the earth's formations, for obtaining well-site measurements from the tools and for generating output logs of well parameters determined from the measurements, the system having a plurality of peripherals units which include a logging tool interface unit comprising:
  (a) first and second parallel central processors, each including a main memory unit for storing program routines and for storing data comprising messages to and from said plurality of peripheral units, each said processor including
    (i) a plurality of serial link units, each having a serial link bus and each having a plurality of serial data input/output channels connected to said serial link bus, each serial channel sending on transmit lines and receiving on receive lines serial data to and from said plurality of peripheral units,
    (ii) a processor interface unit responsive to data ready signals, for controlling the transfer of data between the central processor unit and said plurality of serial link units, said interface unit including an internal interface bus,
    (iii) a microprocessor unit responsive to said processor interface unit and said serial link units for initiating the transfer of data between said plurality of serial link units and said processor interface unit, said plurality of serial link units enabling the simultaneous input/output transfer of data to said plurality of peripheral units, and
    (iv) a processor bus for data transfer between said central processor unit, its main memory, and said processor interface unit; and
  (b) a switch means connected to said processor buses and the transmit and receive lines from each channel of each of said serial link units, and responsive to a switch command for controlling which of said first or second processor units is connected to said peripherals for data transfers therebetween.

29. The processing system of claim 28 wherein each said central processing unit includes a system bus interconnecting said microprocessor unit, said processor interface unit and said plurality of serial link units for data transfers therebetween, said buses enabling the transfer of data to occur simultaneously over established data links between
  (i) said processor unit and said interface unit,
  (ii) said interface unit and said microprocessor unit,
  (iii) said interface unit and one of said plurality of serial units,
  (iv) said microprocessor and one of said plurality of serial units, and
  (v) each of said plurality of serial link units and any one of said peripherals connected to the plurality of serial input/output channels of said serial link unit.

30. The processing system of claim 28 wherein said processor interface unit includes:
  (a) a plurality of interface data registers connected to said processor bus for temporarily storing information being passed between said processor unit and said microprocessor unit or said plurality of serial link units;
  (b) a direct memory access unit responsive to said microprocessor unit for transferring data between said interface data registers and said serial link units; and
  (c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial link unit, and vice versa.

31. The processing system of claim 30 wherein said transferring means obtains data from said main memory independently of processor control.

32. The processing system of claims 28, 29 or 30 wherein each said serial link unit comprises:
  (a) a message buffer memory connected to said serial link bus for temporarily storing incoming and outgoing message data for a peripheral connected to said serial link unit;
  (b) a receive direct memory access unit connected to said serial link bus for controlling the transfer of data between the receive lines of said plurality of serial input/output channels and said buffer memory;
  (c) a transmit direct memory access unit connected to said serial link bus for controlling the transfer of data between the transmit lines of said plurality of serial input/output channels and said buffer memory; and
  (d) a plurality of serial controllers each connected to said serial link bus and each associated with one of said plurality of serial input/output channels, each said controller supervising the exchange of data between the peripheral connected to the serial channel and said serial link unit.

33. The processing system of claim 32 further including a baud rate generator connected to said serial link bus for generating timing signals to determine the transmission rate of the serial data to said peripherals connected to said serial link unit.

34. The processing system of claim 32 wherein said transmit and said receive direct memory access units each comprise a plurality of direct memory access channels, one for each of said plurality of serial input/output channels of said serial link unit.

35. The processing system of claim 34 further including a bus arbitration unit for resolving access to said serial link bus between said direct memory access units and any data transfer to said serial link unit from said microprocessor unit or said processor interface unit.

36. The processing system of claim 35 wherein said direct memory access units alternate in priority as between themselves as to which said access unit will obtain control of said serial link bus as determined by said bus arbitration unit, said plurality of direct memory access channels in each said access unit having a rotating priority threbetween where the channel last serviced has the lowest priority.

37. A well-logging real time date acquisition and data processing system including a plurality of peripheral unit with which a central processor unit must communicate, the peripheral units including a logging tool interface unit for interfacing to a plurality of tools positioned in a well borehole in the earth, the system comprising:
 (a) a central processor unit for executing operating routines involving the transfer of data between said processor and said peripherals, said processor
  (i) coupled to a first plurality of said peripherals for serial data link transfers over transmit and receive lines, and
  (ii) coupled to a second plurality of said peripherals by a parallel processor bus for the parallel transfer of data to and from said second plurality of peripherals;
 (b) a plurality of serial data link units coupled to said central processor, each said serial link unit having a serial link bus and each having a plurality of serial data input/output channels connected to said serial link bus, each said serial channel sending on transmit lines and receiving on receive lines serial data to and from said first plurality of said peripheral units; and
 (c) a system bus interconnecting said processor unit to said plurality of serial data link units, said processor bus, said system bus and said plurality of serial link buses enabling the simultaneous transmission of data from said processor to said peripheral units thereby increasing the thru-put rate of said system.

38. The system of claim 37 further including:
 (a) a processor interface unit responsive to data ready signals, for controlling the transfer of data between said central processor unit and said plurality of serial link units, said interface unit including an internal interface bus, and
 (b) a microprocessor unit responsive to said processor interface unit and said serial link units for initiating the transfer of data between said plurality of serial link units and said processor interface unit.

39. The system of claim 38 wherein the simultaneous transfer of data occurs over data links established between
 (a) said processor unit and said interface unit,
 (b) said interface unit and said microprocessor unit,
 (c) said interface unit and one of said plurality of serial units,
 (d) said microprocessor and one of said plurality of serial units, and
 (e) each of said plurality of serial link units and any one of said peripherals in said first plurality of peripherals connected to the plurality of serial input/output channels of said serial links unit.

40. The system of claim 38 wherein said processor interface unit includes:
 (a) a plurality of interface data registers connected to said processor bus for temporarily storing information being passed between said processor unit and said microprocessor unit or said plurality of serial link units;
 (b) a direct memory access unit responsive to said microprocessor unit for transferring data between said interface data registers and said serial link units; and
 (c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial link unit, and vice versa.

41. The processing system of claim 40 wherein said transferring means obtains data from said main memory independently of processor control.

42. The processing system of claims 38, 40 or 41 wherein each said serial link unit comprises:
 (a) a message buffer memory connected to said serial link bus for temporarily storing incoming and outgoing message data for a peripheral connected to said serial link unit;
 (b) a receive direct memory access unit connected to said serial link bus for controlling the transfer of data between the receive lines of said plurality of serial input/output channels and said buffer memory;
 (c) a transmit direct memory access unit connected to said serial link bus for controlling the transfer of data between the transmit lines of said plurality of serial input/output channels and said buffer memory; and
 (d) a plurality of serial controllers each connected to said serial link bus and each associated with one of said plurality of serial input/output channels, each said controller supervising the exchange of data between the peripheral connected to the serial channel and said serial link unit.

43. The processing system of claim 42 further including a baud rate generator connected to said serial link bus for generating timing signals to determine the transmission rate of the serial data to said peripherals connected to said serial link unit.

44. The processing system of claim 42 wherein said transmit and said receive direct memory access units each comprise a plurality of direct memory access channels, one for each of said plurality of serial input/output channels of said serial link unit.

45. The processing system of claim 44 further including a bus arbitration unit for resolving access to said serial link bus between said direct memory access units and any data transfer to said serial link unit from said microprocessor unit or said processor interface unit.

46. The processing system of claim 45 wherein said direct memory access units alternate in priority as between themselves as to which said access unit will obtain control of said serial link bus as determined by said bus arbitration unit, said plurality of direct memory access channels in each said access unit having a rotating priority therebetween where the channel last serviced has the lowest priority.

47. The system of claim 38 further including:
(a) a second central processor;
(b) a second processor interface unit coupled by a second processor bus to said second processor unit;
(c) a second microprocessor unit;
(d) a second plurality of serial link units;
(e) a second system bus coupling said second microprocessor unit and said serial link units to said second processor interface unit; and
(f) a switch means connected to said processor buses and the transmit and receive lines from each channel of each said second plurality of serial link units, and responsive to a switch command for controlling which of said processor units is connected to said peripherals for data transfers therewith.

48. The system of claim 47 wherein all of said peripheral units are connected to said plurality of serial data link units.

49. A data processing system including peripheral units connected thereto, said system comprising:
(a) a central processor unit including a main memory;
(b) a plurality of serial input/output channels, each interconnected by a serial link bus and each said serial channel sending on transmit lines and receiving on receive lines serial data to and from a first plurality of the peripheral units;
(c) a processor interface unit responsive to signals from said processor unit and said serial link units, for controlling the transfer of data between said central processor unit and said plurality of serial channels, said interface unit including an internal interface bus; and
(d) a microprocessor unit responsive to said processor interface unit and said serial input/output channels for initiating the transfer of data between said plurality of serial channels and said processor interface unit, said plurality of serial channels in cooperation with said processor interface unit and said microprocessor unit permitting the simultaneous input/output transfer of data to a plurality of the peripherals in said first plurality of peripherals.

50. The processing system of claim 49 further including:
(a) a processor bus interconnecting a second plurality of the peripherals units to said central processor unit for data transfers therebetween, said processor bus connecting said processor interface unit to said central processor; and
(b) a system bus interconnecting said microprocessor unit, said processor interface unit and a plurality of groups of said channels, each said group comprising a serial link unit where each unit includes its own serial link bus for data transfers therebetween, said buses enabling the transfer of data to occur simultaneously over established data links between
 (i) said processor unit and a peripheral in said second plurality of peripherals,
 (ii) said processor unit and said interface unit,
 (iii) said interface unit and said microprocessor unit,
 (iv) said interface unit and one of said plurality of serial link units,
 (v) said microprocessor and one of said plurality of serial link units, and
 (vi) each of said plurality of serial link units and any one of the peripherals in said first plurality of peripherals connected to the plurality of serial input/output channels of said serial link unit.

51. The processing system of claim 49 wherein said processor interface unit includes:
(a) a plurality of interface data registers connected to said processor bus for temporarily storing information being passed between said processor unit and said microprocessor unit or said plurality of serial channels;
(b) a direct memory access unit responsive to said microprocessor unit for transferring data between said interface data registers and said serial channels; and
(c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial input/output channel, and vice versa.

52. The processing system of claim 51 wherein said transferring means obtains data from said main memory independently of processor control.

53. The processing system of claims 49, 50 or 51 wherein said serial input/output channels comprise:
(a) a message buffer memory connected to said serial link bus for temporarily storing incoming and outgoing message data for a peripheral connected to said serial channels;
(b) a receive direct memory access unit connected to said serial link bus for controlling the transfer of data between the receive lines of said plurality of serial input/output channels and said buffer memory;
(c) a transmit direct memory access unit connected to said serial link bus for controlling the transfer of data between the transmit lines of said plurality of serial input/output channels and said buffer memory; and
(d) a plurality of serial controllers each connected to said serial link bus and each associated with one of said plurality of serial input/output channels, each said controller supervising the exchange of data between the peripheral connected to the serial channel and said serial channel.

54. The processing system of claim 53 further including a baud rate generator connected to said serial link bus for generating timing signals to determine the transmission rate of the serial data to said peripherals connected to said serial channels.

55. The processing system of claim 53 wherein said transmit and said receive direct memory access units each comprise a plurality of direct memory access channels, one for each of said plurality of serial input/output channels.

56. The processing system of claim 55 further including a bus arbitration unit for resolving access to said serial link bus between said direct memory access units and any data transfer to said serial channels from said microprocessor unit or said processor interface unit.

57. The processing system of claim 56 wherein said direct memory access units alternate in priority as between themselves as to which said access unit will obtain control of said serial link bus as determined by said bus arbitration unit, said plurality of direct memory access channels in each said access unit having a rotating priority therebetween where the channel last serviced has the lowest priority.

58. A well-logging data acquisition and processing system responsive to signals from well-logging tools contained in a well borehole drilled into the earth's formations, for obtaining well-site measurements from the tools and for generating output logs of well parameters determined from the measurements, the system having a plurality of peripherals units which include a logging tool interface unit, the system comprising:
   (a) first and second parallel central processors, each including a main memory unit for storing program routines and for storing data comprising messages to and from a first plurality of peripheral units, each said processor including
      (i) a plurality of serial channels, each interconnected by a serial link bus and each serial channel sending on transmit lines and receiving on receive lines serial data to and from said first plurality of the peripheral units,
      (ii) a processor interface unit responsive to data ready signals, for controlling the transfer of data between the central processor unit and said plurality of serial channels, said interface unit including an internal interface bus,
      (iii) a microprocessor unit responsive to said processor interface unit and said serial channels for initiating the transfer of data between said plurality of serial channels and said processor interface unit, and
      (iv) a processor bus for data transfer between said central processor unit, its main memory, said processor interface unit, and a second plurality of said peripheral units; and
   (b) a switch means connected to said processor buses and the transmit and receive lines from each channel of each of said serial link units and responsive to a switch command for controlling which of said first or second processor units is connected to said peripherals for data transfers therebetween.

59. The processing system of claim 58 wherein each said central processing unit includes a system bus interconnecting said microprocessor unit, said processor interface unit and said plurality of serial channels for data transfers therebetween, said plurality of serial channels arranged in groups where each group comprises a serial link unit having its own serial link bus, said buses enabling the transfer of data to occur simultaneously over established data links between
   (i) said processor unit and said interface unit,
   (ii) said interface unit and said microprocessor unit,
   (iii) said interface unit and one of said plurality of serial units,
   (iv) said microprocessor and one of said plurality of serial units, and
   (v) each of said plurality of serial link units and any one of said peripherals in said first plurality of peripherals connected to the plurality of serial input/output channels of said serial link unit.

60. The processing system of claim 58 wherein said processor interface unit includes:
   (a) a plurality of interface data registers connected to said processor bus for temporarily storing information being passed between said processor unit and said microprocessor unit or said plurality of serial channel;
   (b) a direct memory access unit responsive to said microprocessor unit for transferring data between said interface data registers and said serial channel; and
   (c) means responsive to said microprocessor unit for transferring data between said interface data registers and said main memory, said transferring means and said direct memory access unit responding to initiating signals from said microprocessor unit to enable data comprising outgoing message data to be transferred from main memory to a serial input-/output channel, and vice versa.

61. The processing system of claim 60 wherein said transferring means obtains data from said main memory independently of processor control.

62. The processing system of claims 58, 59 or 60 wherein said serial input/output channels comprise:
   (a) a message buffer memory connected to said serial link bus for temporarily storing incoming and outgoing message data for a peripheral connected to said serial channels;
   (b) a receive direct memory access unit connected to said serial link bus for controlling the transfer of data between the receive lines of said plurality of serial input/output channels and said buffer memory;
   (c) a transmit direct memory access unit connected to said serial link bus for controlling the transfer of data between the transmit lines of said plurality of serial input/output channels and said buffer memory; and
   (d) a plurality of serial controllers each connected to said serial link bus and each associated with one of said plurality of serial input/output channels, each said controller supervising the exchange of data between the peripheral connected to the serial channel and said serial channel.

63. The processing system of claim 62 further including a baud rate generator connected to said serial link bus for generating timing signals to determine the transmission rate of the serial data to said peripherals connected to said serial channels.

64. The processing system of claim 62 wherein said transmit and said receive direct memory access units each comprise a plurality of direct memory access channels, one for each of said plurality of serial input/output channels.

65. The processing system of claim 64 further including a bus arbitration unit for resolving access to said serial link bus between said direct memory access units and any data transfer to said serial channels from said microprocessor unit or said processor interface unit.

66. The processing system of claim 65 wherein said direct memory access units alternate in priority as between themselves as to which said access unit will obtain control of said serial link bus as determined in said bus arbitration unit, said plurality of direct memory access channels in each said access unit having a rotating priority therebetween where the channel last serviced has the lowest priority.

* * * * *